United States Patent
Castrillo et al.

(10) Patent No.: US 12,015,705 B1
(45) Date of Patent: Jun. 18, 2024

(54) VERIFIED QUANTUM RANDOM NUMBER GENERATION FOR CRYPTOGRAPHIC APPLICATIONS

(71) Applicant: Google LLC, Mountain View, CA (US)

(72) Inventors: Sergio Boixo Castrillo, Rancho Palos Verdes, CA (US); Alan Kar-Lun Ho, Los Angeles, CA (US); Jimmy C. Chau, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 53 days.

(21) Appl. No.: 17/221,291

(22) Filed: Apr. 2, 2021

Related U.S. Application Data

(60) Provisional application No. 63/010,334, filed on Apr. 15, 2020, provisional application No. 63/004,915, filed on Apr. 3, 2020.

(51) Int. Cl.
| | | |
|---|---|---|
| *H04L 9/08* | (2006.01) | |
| *G06F 7/58* | (2006.01) | |
| *G06N 10/00* | (2022.01) | |

(52) U.S. Cl.
CPC .............. *H04L 9/0869* (2013.01); *G06F 7/58* (2013.01); *G06N 10/00* (2019.01); *H04L 9/0852* (2013.01)

(58) Field of Classification Search
None
See application file for complete search history.

(56) References Cited

U.S. PATENT DOCUMENTS

| | | | |
|---|---|---|---|
| 7,353,148 B1 * | 4/2008 | Meyers ................ | B82Y 10/00 977/932 |
| 11,556,686 B2 | 1/2023 | Castrillo et al. | |

(Continued)

FOREIGN PATENT DOCUMENTS

WO    WO 2020/226715    11/2020

OTHER PUBLICATIONS

Boixo et al., "Characterizing Quantum Supremacy in Near-Term Devices", Apr. 5, 2017, pp. 1-23, downloaded from the Internet on Oct. 20, 2022, URL: https://arxiv.org/pdf/1608.00263.pdf (Year: 2017).*

(Continued)

*Primary Examiner* — Trang T Doan
(74) *Attorney, Agent, or Firm* — Dority & Manning P.A.

(57) ABSTRACT

Systems and methods for quantum random number generation are provided. In some implementations, a method can include obtaining data indicative of a quantum circuit used by the quantum random number generation system to generate a quantum entropy source for determining a random number. The quantum entropy source can include a plurality of output samples. Each output sample can be obtained by measuring an output of the quantum circuit. The method can include performing one or more simulations of the quantum circuit to obtain a simulated output distribution of the quantum circuit without access to data associated with the random number. The method can include providing data indicative of the simulated output distribution for use in a verification process for the quantum random number generation system. The verification process can determine the use of the quantum computing system in generation of the quantum entropy source.

15 Claims, 9 Drawing Sheets

(56) References Cited

U.S. PATENT DOCUMENTS

| | | | | |
|---|---|---|---|---|
| 2010/0110935 A1* | 5/2010 | Tamassia | ............ | H04L 67/1065 |
| | | | | 370/256 |
| 2014/0164313 A1* | 6/2014 | Alboszta | ................. | G06N 7/01 |
| | | | | 706/52 |
| 2017/0126654 A1* | 5/2017 | Fu | ......................... | H04L 9/0858 |
| 2018/0292786 A1* | 10/2018 | Sakai | ..................... | G21K 1/006 |
| 2021/0049492 A1* | 2/2021 | Kim | ....................... | G06N 10/00 |
| 2022/0100473 A1* | 3/2022 | Aaronson | .............. | G06N 10/80 |

OTHER PUBLICATIONS

Benenti et al., "Quantum simulation of the single-particle Schrédinger equation", Jul. 2008, pp. 1-7, downloaded from the Internet on Oct. 20, 2022, URL: https://aapt.scitation .org/doi/pdf/10.1119/1.2894532 (Year: 2008).*

Mahadev et al., "Efficient Certifiable Randomness from a Single Quantum Device", arXiv:2204.11353v1, dated Apr. 24, 2022, 16 pages.

Aaronson, "Aspects of Certified Randomness from Quantum Supremacy", May 16, 2019, 22 pages.

Brakerski et al., "A Cryptographic Test of Quantumness and Certifiable Randomness from a Single Quantum Device", 2018 IEEE 59th Annual Symposium on Foundations of Computer Science, Oct. 7-9, 2018, Paris, France, pp. 320-331.

* cited by examiner

VERIFIED QUANTUM RANDOM NUMBER GENERATION FOR CRYPTOGRAPHIC APPLICATIONS

PRIORITY CLAIM

The present application claims the benefit of priority of U.S. Provisional Application Ser. No. 63/004,915, titled VERIFIED QUANTUM RANDOM NUMBER GENERATION FOR CRYPTOGRAPHIC APPLICATIONS, filed on Apr. 3, 2020, which is incorporated herein by reference. The present application claims the benefit of priority of U.S. Provisional Application Ser. No. 63/010,334, titled VERIFIED QUANTUM RANDOM NUMBER GENERATION FOR CRYPTOGRAPHIC APPLICATIONS, filed on Apr. 15, 2020, which is incorporated herein by reference.

FIELD

The present disclosure relates generally to quantum computing systems, and more particularly to generation of random numbers using quantum computing systems for use in, for instance, cryptographic applications with the need for private randomness and public randomness.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b |1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for determining use of a quantum computing system in a quantum random number generation system. The quantum random number generation system can be implemented at least in part using the quantum computing system having one or more qubits. The method can include obtaining, by one or more computing devices comprising one or more classical processors, data indicative of a quantum circuit used by the quantum random number generation system to perform a quantum operation to generate a quantum entropy source for determining a random number. The quantum circuit can include one or more quantum gates. The quantum entropy source can include a plurality of output samples. Each output sample can be obtained by measuring an output of the quantum circuit. The method can include performing, by the one or more computing devices, one or more simulations of the quantum circuit to obtain a simulated output distribution of the quantum circuit without access to data associated with the random number. The method can include providing, by the one or more computing devices, data indicative of the simulated output distribution for use in a verification process for the quantum random number generation system. The verification process can determine the use of the quantum computing system in generation of the quantum entropy source.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
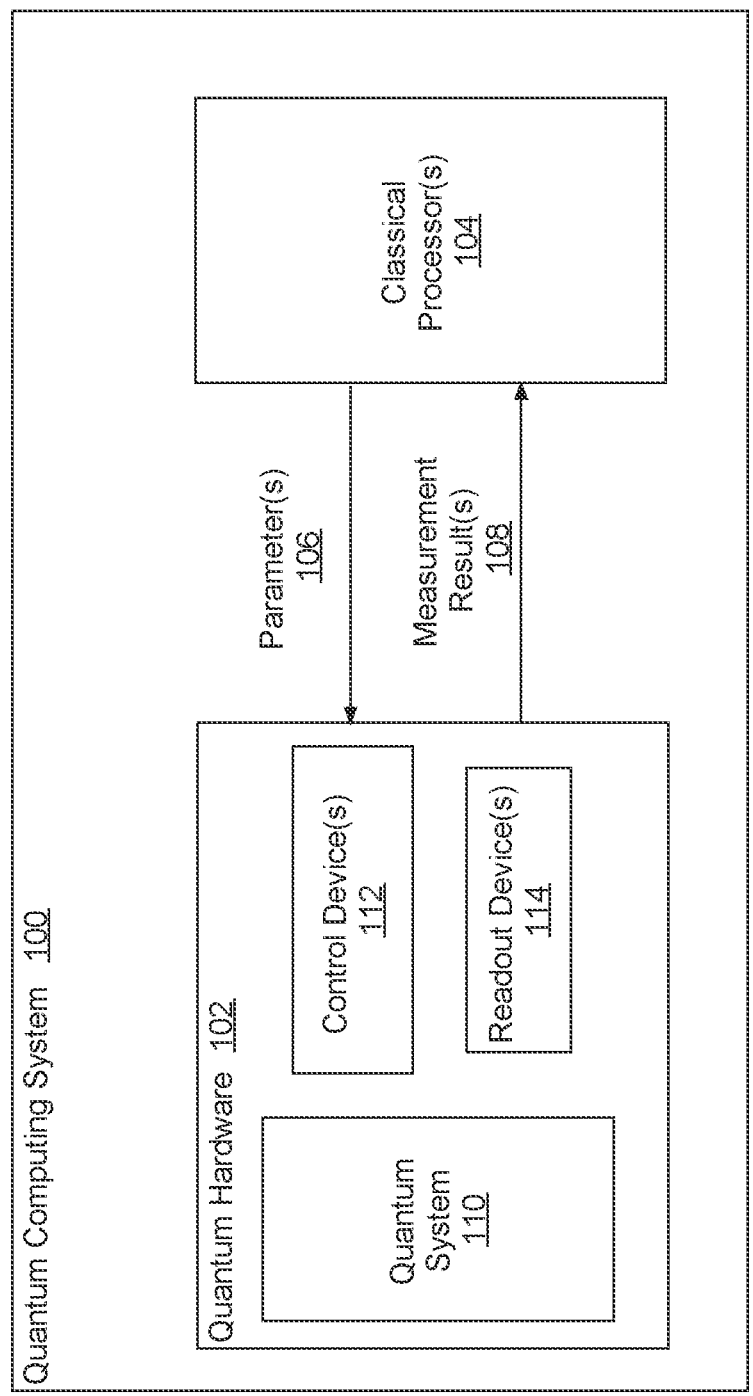
FIG. 1 depicts an example quantum computing system according to example embodiments of the present disclosure.

Quantum computing systems can be used for random number generation. According to example aspects of the present disclosure, systems and methods are disclosed for providing verified quantum random number generation. Verified quantum random number generation refers to the capability to determine (e.g., verify or certify) that a quantum computing system having one or more qubits was used at least in part for generation of random number(s). In some embodiments, quantum computing systems can be used for generation of random number(s) for private randomness applications. As used herein, private randomness refers to situations where random number(s) and/or other aspects of random number generation are not made known and/or are not shared. One example application of private randomness can be the use of random number(s) for cryptographic key generation.

For example, a quantum computing system can implement a quantum circuit having one or more quantum gates on a set of qubits to generate a quantum entropy source for quantum random number generation. The quantum entropy source can include, for instance, a plurality of output samples (e.g., bit strings) generated by performing repeated samples (e.g., measurements) of the state of a plurality of qubits in the quantum system after implementation and execution of the one or more quantum gates. The probability distribution of the output samples can be dependent on the quantum gate(s) implemented on the qubits. A seeded randomness extractor can be used to extract random number(s) from the quantum entropy source. The seeded randomness extractor and/or random number(s) can be kept private, for instance, in various applications, such as cryptographic key generation.

In some cases, it may be desirable for a user of a quantum random number generation system to determine that a quantum computing system was used in the generation of the random numbers or to otherwise verify the random number generation protocol. As one example, a quantum random number generation system can be used in a cryptographic key management service as a source of randomness for generating cryptographic keys. Users of the cryptographic key management service may need to determine that the key management service is properly using a quantum random number generation system to generate the cryptographic keys and to determine that the quantum random number generation system is performing correctly. However, revealing the randomness used to generate the cryptographic keys could also reveal the key material, which may be intended to be kept private even from the user of the key management service.

Example aspects of the present disclosure are directed to systems and methods that allow a user or other party to determine that a quantum computing system was used in the generation of the random numbers (e.g., by generating a quantum entropy source). For instance, in one implementation, a user can interact with quantum random number generation system at time T. In each interaction, a user can select a random quantum circuit (e.g., having one or more quantum gates) and can require a quantum entropy source (e.g., a sample of bit strings) to be returned in a short enough time t. The time t can be chosen to be short enough so that a potential adversary is not able to deterministically produce (e.g., classically simulate with one or more classical processors) an entropy source (e.g., the sample of bit strings) that would pass verification. In some cases, the user of the quantum random number generation system can implement a verification protocol to determine (e.g., certify or verify) that a quantum computing system was used to generate the quantum entropy source by performing benchmarking tests, such as a cross-entropy benchmarking (XEB) test or a heavy output generation (HOG) benchmarking test on the quantum entropy source.

More particularly, a user of a quantum random number generation system may need to verify or obtain a certification of the quantum random number generation protocol. However, due to limited computational resources, the user may be unable to effectively perform the requisite classical simulations or computations to execute the verification algorithm. According to example aspects of the present disclosure, the user can offload at least a portion of the verification process to a computationally resourceful verifying party that has the classical computing resources sufficient to simulate the quantum circuit used in the quantum random number generation protocol, for instance, with classical computing systems (e.g., having one or more classical processors executing classical algorithms). The user can check, through an interactive proof, that the verifying party has correctly performed the verification process. The verifying party and the party implementing the quantum random number generation system can be the same entity or can be different entities.

For instance, in some embodiments, a user of a quantum random number generation system first interacts with the quantum random number generation system to obtain a quantum entropy source from a quantum computing system. For instance, a user can provide data indicative of a quantum circuit to be implemented by the quantum computing system. The quantum circuit can include a plurality of randomly selected quantum gates (e.g., single qubit gates, multiple qubit gates, etc.) that are selected based on the data indicative of the quantum circuit. For instance, the quantum gates can be selected based on an input string or seed received from a user of the quantum random number generation system. In addition and/or in the alternative, the user can specify which combination of quantum gates to be used in the quantum circuit.

The quantum random number generation system can execute the quantum circuit and sample a plurality of qubits a repeated number of to obtain readouts or measurements of the plurality of qubits in the quantum computing system. The measurements can be provided as output samples (e.g., bit strings) as the quantum entropy source.

To determine that a quantum computing system was used in the generation of the quantum entropy source, the user can provide data indicative of the quantum circuit and/or the output samples to a verification computing system. The verification computing system can be a third party with sufficient computational resources to perform classical simulations of the quantum circuit. The verification computing system can be associated with the same entity.

The verification computing system can perform classical simulations of the quantum circuit to determine output probabilities of the output samples in the quantum entropy source. These probabilities can be used to perform a benchmarking test to determine that a quantum computing system was used to generate the quantum entropy source. The benchmarking tests can include, for instance cross entropy benchmarking or heavy output generation probability tests. The benchmarking tests can be performed by the verification computing system and/or by a computing system associated with the user based on the classical simulations of the quantum circuit.

The verification computing system can implement classical parallelizable algorithm(s) to simulate quantum circuits to determine output sample probabilities. As discussed in more detail below, the algorithm(s) can be representable as a map-reduce algorithm. For example, the algorithm(s) can include, for instance, a Schrödinger-Feynman algorithm that breaks the quantum circuit up into a plurality of patches of qubits. The algorithm(s) can include, for instance, a Feynman algorithm that maps a calculation of a probability of an output sample to a tensor network or a graphical model. The simulations can use techniques such as patch, elided, and/or other simplified cross entropy benchmarking to preserve classical computing resources for performing the simulations.

In some embodiments, the verification computing system can record the result of each of the classical simulations and return the record of results to the user. The user computing system can aggregate the results to determine a full set of simulated probabilities for the output samples in the quantum entropy source. The user can determine that a quantum computing system was used to generate the quantum entropy source by implementing a benchmarking test. In some embodiments, a verification process can be implemented on only a subset of the output samples in the quantum entropy source.

In some embodiments, the verification computing system can aggregate the results of the classical simulations and can determine a full set of probabilities for the output samples in the quantum entropy source. The verification computing system can generate a hash tree structure (e.g., Merkle-tree-like structure). In the hash tree structure, the leaf nodes are each a cryptographic hash of one of the simulation results. The other nodes are a list, tuple, or other data structure including data representing an intermediate or final aggregate result and each of the node's child nodes in the hash tree structure. The verification computing system can return a root node to the user. The data can then be used, for instance, by the user to implement the verification process.

According to example aspects of the present disclosure, a user of a quantum random number generation service can specify requirements of a quantum entropy source to be used in random number generation. One example requirement can be a desired entropy requirement (e.g., min-entropy) for the quantum entropy source to be used in random number generation. For instance, a user can provide data indicative of a desired min-entropy for the quantum entropy source. The min-entropy of the quantum entropy source provides a measure of the unpredictability of the set of outcomes (e.g., bit strings) of a quantum circuit used as the quantum entropy source. In some embodiments, the min-entropy for a random variable X can be defined as:

$$\text{min-entropy} = \min \log(1/(P(X=x)))$$

In response to obtaining the data indicative of desired min-entropy, the quantum random number generation system can determine a number of output samples for the quantum entropy source to be generated by implementing the quantum circuit and measuring the qubits in a quantum computing system. For instance, output samples for the quantum entropy source can be obtained by sampling the quantum circuit m times where the number m is determined as a function of the desired min-entropy and a fidelity associated with the quantum system. The fidelity of the quantum system is a measure of a probability of no error during implementation of the quantum circuit and will be discussed in more detail below. In some embodiments, output samples for the quantum entropy source can be obtained by sampling the quantum circuit m times where the number m is determined as a function of the desired min-entropy, the fidelity associated with quantum system, and a number of qubits in the quantum system.

In this way, the quantum random number generation system can determine a number of times to sample a quantum circuit to generate a quantum entropy source to meet entropy requirements of the quantum random number generation system. This can lead to a proper allocation of quantum computing resources for generation of the quantum entropy source, while preserving quantum computing resources for other functions.

The user of the quantum random number generation system can implement several approaches to preserve private randomness. For instance, the user can offload the verification process to a third-party verification computing system to determine that the quantum entropy source used for random number generation was generated by a quantum computing system. However, the seeded randomness extractor and/or random numbers can be maintained confidential by the user of the quantum random number generation system and not shared with the verification computing system. As another example, the user can perform the verification itself, without relying on a third party for verification, to preserve the secrecy of the resulting random numbers. As another example, the user can submit the requisite data for only a subset of random numbers extracted from the quantum entropy source for verification while preserving the confidentiality of other random numbers. As another example, the user can submit only a subset of the output samples of the quantum entropy source for verification while preserving the confidentiality of the remainder of the output samples.

The systems and methods according to example embodiments of the present disclosure can have a number of technical effects and benefits. For instance, entropy sources for random number generation can be generated efficiently by sampling qubits in a quantum computing system a specific number of times determined based on user requirements for the entropy source (e.g., min-entropy). This allows the number of samples to be more tightly controlled so that quantum computing resources can be preserved and not wasted.

In addition, offloading a verification process to a third party with sufficient classical computing resources (e.g., one or more server farms) to perform classical simulations of the quantum circuit can allow for users without significant classical computing resources to obtain verification of quantum entropy sources for quantum random number generation without having to inefficiently monopolize the classical computing resources of the user. This can provide more feasibility of use of quantum computing systems for random number generation in certain applications, such as private randomness applications, such as cryptographic key generation.

As used herein, a quantum circuit can include one or more quantum gates that are applied in a specific sequence to a register of qubits to encode quantum information. In theory, any quantum algorithm can be implemented with high precision by applying a correctly chosen sequence of quantum gates. However, in practice quantum gates are error prone instead of implementing a unitary quantum operation representing an ideal quantum gate, a corresponding noisy quantum operation is implemented.

The fidelity of a quantum operation is a measure of how close a noisy quantum operation $\mathcal{E}$ is to an ideal unitary quantum operation $\mathcal{U}$. The quantum logic gate fidelity between $\mathcal{E}$ and $\mathcal{U}$ for a given quantum state $\rho$ may be given by:

$$\mathcal{F}_{\mathcal{E},\mathcal{U}}(\rho) = \left( tr\left( \sqrt{ \sqrt{\mathcal{E}(\rho)} \mathcal{U}(\rho) \sqrt{\mathcal{E}(\rho)} } \right) \right)^2.$$

Benchmarking techniques associated with quantum computing systems, e.g., cross-entropy benchmarking (XEB) methods or statistical methods, can be used to characterize how far the quantum states produced by a quantum system are from the states expected for the ideal quantum operation, thus characterizing amount of errors. Benchmarking techniques typically include executing random quantum circuits on a quantum processor to determine probabilities of bit strings representing measurement results, using classical algorithms to simulate execution of the random quantum circuits to obtain corresponding ideal probabilities of the bit strings representing measurements results, and estimating fidelity using the probabilities according to the equations of the different methods.

The computational cost of implementing the classical algorithms to simulate execution of the random quantum circuits scales exponentially and therefore can become very expensive for increasing numbers of qubits or circuit depth. Benchmarking techniques can overcome this problem by estimating system fidelity for quantum circuits of increasing number or qubits, as long as the classical simulation is affordable. The system fidelity can also be estimated for circuits of the same number of qubits and increasing depth. The obtained fidelities can then be extrapolated to a number of qubits and circuits depth that cannot be simulated at an affordable cost.

Benchmarking techniques can rely on extrapolation, and cannot always provide accurate estimates of fidelity. In addition, as the complexity of quantum computations grow exponentially, experiments enter into complexity regimes. In physics and engineering it is critical to be able to rely on measures, e.g., fidelity, that are as precise as possible when first exploring new regimes such as those with increasing complexity, number of qubits and circuit depth.

Patch cross-entropy benchmarking includes spatially splitting the quantum circuit into two isolated patches by removing a slice of two-qubit gates. The remaining patches can then be easily simulated. For example, for a circuit of 50 qubits we can remove a slice of two-qubit gates approximately along the middle. The remaining two isolated patches are circuits with 25 qubits, easy to simulate with classical processors.

Another technique—herein referred to as "elided cross-entropy benchmarking—builds on patch cross-entropy benchmarking and reintroduces a few of the removed two-qubit gates to more closely mimic the full experiment while still maintaining simulation feasibility. The resulting circuit can be simulated with existing algorithms, e.g., the Schrödinger-Feynman algorithm (also called the Schrödinger-Feynman hybrid algorithm).

With reference now to the FIGS., example embodiments of the present disclosure will be discussed in further detail. As used here, the use of the term "about" in conjunction with a value refers to within 20% of the value.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum logic gates or circuits of quantum logic gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust a frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulse) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2:
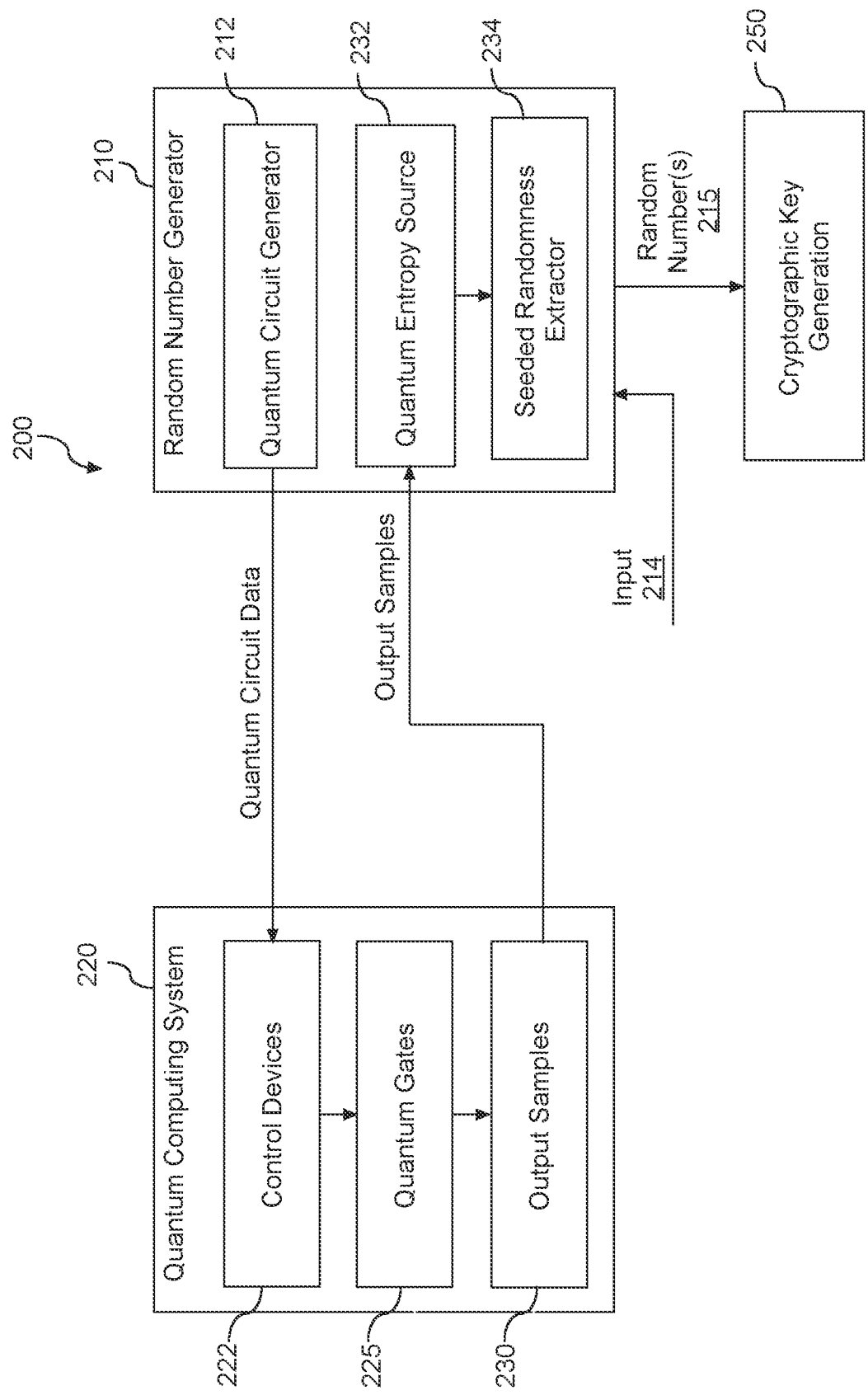
FIG. 2 depicts an example quantum random number generation system according to example embodiments of the present disclosure.

FIG. 2 depicts an overview of a quantum random number generation system 200 according to example aspects of the present disclosure. The system can include a quantum random number generator 210. The quantum random number generator 210 can include computer-readable instructions that when executed by one or more classical processors generate random number(s) 215 based at least in part on data received from a quantum computing system 220. The random number(s) 215 can be used for a variety of applications, including cryptographic key generation 250. The random number generator 210 can be accessed from one or more remote devices or programs (e.g., via an application programming interface). The random number generator 210 can be implemented on a server device that is accessed by a client device over a network.

In some embodiments, the quantum random number generator 210 can receive input 214 from a user of the random number generator (e.g., via a suitable user interface) specifying a request for generation of random number(s) and certain requirements for random number generation, such as entropy requirements, such as a min-entropy requirement. In some embodiments, the input 214 can include a seed used for the quantum circuit generator 212 to generate a random quantum circuit.

In some embodiments, the input can specify characteristics of the quantum circuit (e.g., number of qubits operated on, circuit depth, types of gates, number of multiple-qubit gates etc.). The characteristics can be set such that the simulation time for classically simulating the quantum circuit is longer than a threshold T (e.g., longer than 1 minute). The threshold T can be set such that a quantum computer can return the output samples in less than time T but it takes longer than time T to classically simulate. The more difficult the quantum circuit to simulate, the more expensive the verification process (e.g., costs to classically simulate). In this regard, in some embodiments, a user of the random number generator 210 can specify characteristics of the quantum circuit) based at least in part on estimated costs for verification (e.g., cost for running 1 million or more CPU cores for multiple hours).

The quantum circuit generator 212 can generate data indicative of a random sequence of quantum gates to be implemented on a quantum system by the quantum computing system 220. In some embodiments, the quantum circuit generator 212 can randomly select the sequence of quantum gates. In some embodiments, the quantum circuit generator 212 can generate the sequence of quantum gates based on a seed (e.g., string). The seed can be received, for instance, as input 214 from a user of the random number generator or from another source.

The quantum circuit data can be provided to the quantum computing system 220. Control devices 222 can be used to implement one or more quantum gates 225 to implement the quantum circuit on one or more qubits in a quantum system. The control devices 222 can obtain a plurality of output samples 230 (e.g., bit strings) by implementing the quantum gates 225 and taking a measurement of the state of the quantum system a repeated number of times.

Figure 3:
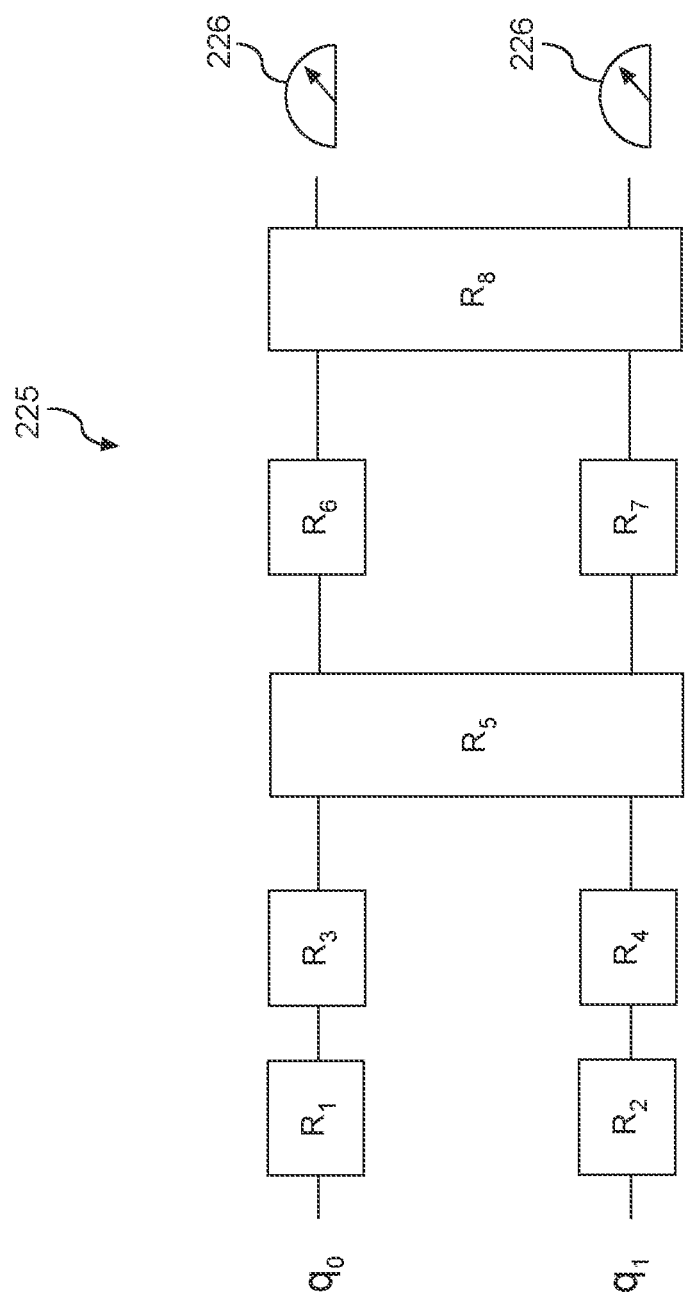
FIG. 3 depicts an example quantum circuit having a plurality of quantum gates used to generate a quantum entropy source according to example embodiments of the present disclosure.

FIG. 3 depicts one example wire diagram representation of a quantum circuit having quantum gates 225 implemented to generate the output samples 230 according to example embodiments of the present disclosure. As shown, the quantum circuit can include a random sequence of single qubit gates R1, R2, R3, R4, R6, and R7 and/or a random sequence of two-qubit gates R6, R8 performed on qubits q0 and q1.

Two qubits are illustrated for purposes of illustration and discussion. Those of ordinary skill in the art, using the disclosures provided herein, will understand that any number of qubits can be included in the quantum system without deviating from the scope of the present disclosure. Repeated measurements 226 (e.g., each after implementation of quantum gates) can be performed of the qubits q0 and q1 to generate output samples 230 for a quantum entropy source 232 according to example embodiments of the present disclosure.

More particularly, referring back to FIG. 2, the output samples 230 can be provided to the random number generator 210 to serve as a quantum entropy source 232 for random number generation. The quantum entropy source 232 can include a plurality of bit strings. Certain bit strings will appear with a greater probability relative to other bit strings depending on the quantum gates 225 applied to the quantum system. The random number generator 210 can use a seeded randomness extractor 234 (e.g., function, algorithm, etc.) to generate a random number(s) 215 from the plurality of bit strings in the quantum entropy source 232. The random number(s) can be provided for a variety of uses, such as for cryptographic key generation 250.

According to example aspects of the present disclosure, a random number generation system can be configured to generate a quantum entropy source having a number of output samples determined based at least in part on characteristics of the quantum computing system and/or user requirements, such as entropy requirements, such as a min-entropy requirement. For instance, the present inventors have discovered that the number of output samples that need to be generated by sampling the quantum system after implementation of a quantum circuit can be determined as a function of an entropy requirement (e.g., min-entropy requirement) and a fidelity associated with the quantum circuit and/or a number of qubits in the system.

For instance, the experimental output of a noisy random quantum circuit can be described as $$F|\psi\rangle\langle\psi|+(1-F)\chi$$

where F is the experimental fidelity (probability of no-error), $|\psi\rangle$ is the ideal output of the quantum circuit and $\chi$ is the result of errors. The ideal or simulated output probability for a bistrings z is $p(z)=|\langle z|\psi\rangle|^2$. The distribution of the probabilities themselves $\{p(z)\}$ follows an exponential or Porter-Thomas distribution for deep enough circuits $$P(Dp(z)\leq x)=1-e^{-x}.$$

For the purposes of quantum randomness generation with adversarial noise generation, the output can be written using the following adversarial noise model:

$$F|\psi\rangle\langle\psi|+(1-F)|0\rangle\langle 0|$$

where $|0\rangle$ stands for a generic deterministic output. The value of the fidelity can be determined as the fidelity for a quantum system determined using cross-entropy benchmarking as described above.

Given the adversarial noise model above, the output sample with the highest probability is the deterministic noise with probability (1-F). Therefore for a sample of size m the min-entropy is:

$$\text{min-entropy}=-\log((1-F)^m)\cong mF.$$

In this regard, the number of output samples to achieve a specific min-entropy can be determined as a function of the Fidelity of the quantum system, such as by dividing the min-entropy requirement by the fidelity F associated with the quantum system.

In some embodiments, the number of output samples m can be determined as a function of characteristics of the quantum system (e.g., the number of qubits) and the fidelity associated with the quantum circuit. For instance, given the adversarial noise model above, a constant $c_1$ can be chosen such that with given high probability there are $mF-c_1\sqrt{mF(1-F)}$ samples from the ideal distribution, with no error or noise. For instance, $c_1=5$ results in a probability $1.5\times10^{-12}$.

The min-entropy of a sample of size k of output samples can be analyzed using a Porter-Thomas distribution and supported by a Kolmogorov-Smirnov test. The minus log probability of a sample has normal distribution with average $k(\log(D)-1+\gamma)$ where $D=2^n$ is the Hilbert space dimension for n qubits, and $\gamma$ is the Euler constant. The variance is $$k\frac{\pi^2}{6}.$$

A constant $c_2$ can be chosen such that with given high probability the min-entropy (or ε-min-entropy) is $$k(\log(D) - 1 + \gamma) - c_2\sqrt{k\frac{\pi^2}{6}}.$$

Accordingly, the min-entropy can be determined as:

$$k(\log(D) - 1 + -\gamma) - c_2\sqrt{mF\frac{\pi^2}{6}}) \text{ where } k = mF - c_1\sqrt{mF(1-F)}$$

where $D=2^n$ is the Hilbert space dimension for n qubits. In this regard, the number of output samples to achieve a specific min-entropy can be determined as a function of the fidelity and the number of qubits in the quantum system.

Figure 4:
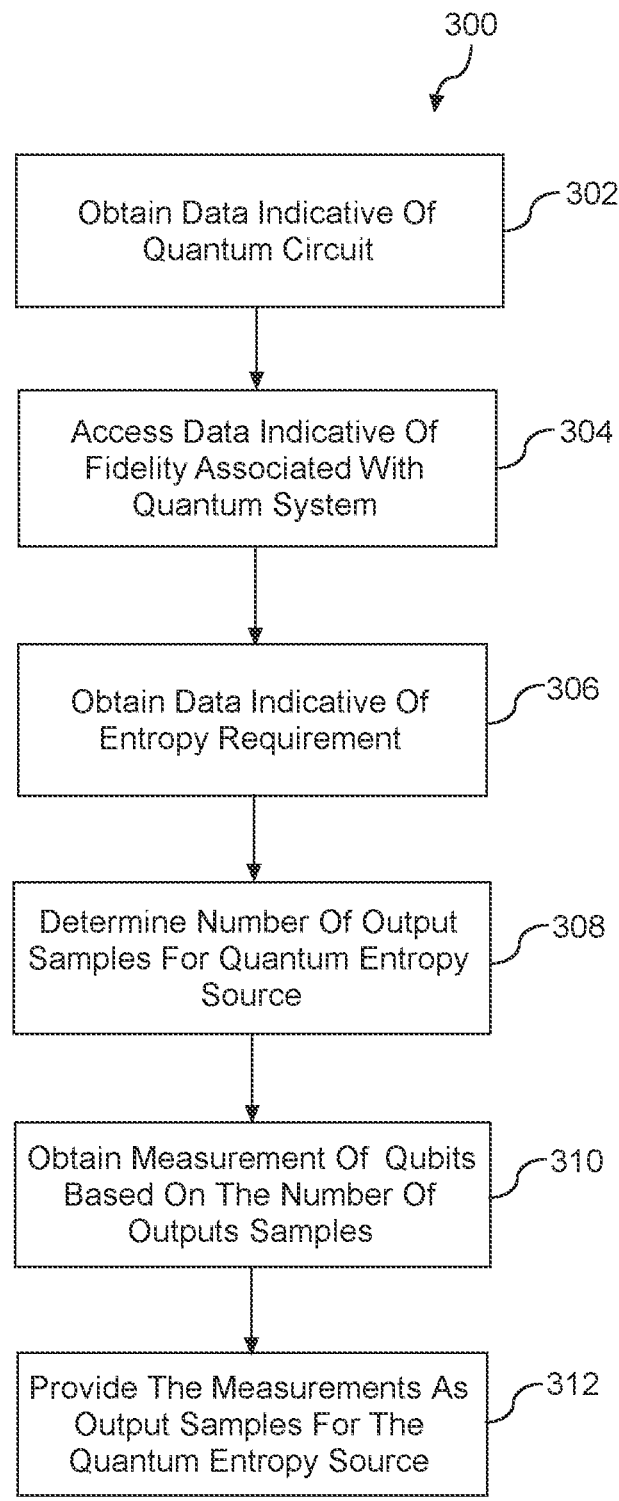
FIG. 4 depicts a flow diagram of an example method according to example embodiments of the present disclosure.

FIG. 4 depicts a flow diagram of an example method 300 according to example embodiments of the present disclosure. The method 300 can be implemented using any suitable classical computing system and/or quantum computing system. FIG. 4 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At (302), the method can include obtaining data indicative of a quantum circuit. For instance, the random number generator 210 (FIG. 2) can receive data indicative of the quantum circuit. Data indicative of the quantum circuit can be data sufficient to identify a sequence of quantum gates used to generate a quantum entropy source for random number generation. The data indicative of the quantum circuit can be obtained, for instance, a seed used to generate a quantum circuit using, for instance, quantum circuit generator 212.

At (304), the method can include accessing data indicative of a fidelity associated with the quantum system. For instance, the random number generator 210 can access data indicative of fidelity from one or more memory devices. In some embodiments, the fidelity can be associated with the specific quantum circuit to be implemented to generate the quantum entropy source. In the alternative, the fidelity can be associated with a representative fidelity the quantum system. The value of the fidelity can be determined as the fidelity for a quantum system determined using cross-entropy benchmarking as described above.

At (306), the method can include obtaining data indicative of an entropy requirement, such as a min-entropy requirement. For instance, the random number generator 210 can access data indicative of the entropy requirement provided as input 214 from a user.

At (308), the method can include determining a number of output samples for the quantum entropy source based at least in part on the fidelity associated with the quantum circuit and the entropy requirement. For instance, the random number generator 210 can determine the number of output samples for the entropy source. As demonstrated, in some cases, the min-entropy can be determined based on the following:

$$\text{min-entropy}=-\log((1-F)^m)\cong mF.$$

In this regard, the number of output samples to achieve a specific min-entropy can be determined as a function of the fidelity.

In some embodiments, the min-entropy can be determined based on the following:

$$k(\log(D) - 1 + -\gamma) - c_2\sqrt{mF\frac{\pi^2}{6}}) \text{ where } k = mF - c_1\sqrt{mF(1-F)}$$

where $D=2^n$ is the Hilbert space dimension for n qubits. In this regard, the number of output samples to achieve a specific min-entropy can be determined based on the fidelity and the number of qubits in the quantum system.

At (310), the method can include obtaining measurements of a state of a quantum system based on the number of output samples. For instance, the random number generator 210 can send signals to the control devices 222 to perform a number of measurements of the quantum systems after implementation of the quantum circuit to generate the output samples. The measurements can be provided as output samples for the quantum entropy source at (312). The output samples can be provided to the random number generator 210.

In some embodiments, a user of a quantum random number generation system may need to determine (e.g., verify or certify) that a quantum computer was used in the generation of a quantum entropy source for random number generations and/or to otherwise verify, certify, or audit the random number generation protocol. As discussed above, performing a verification protocol with limited classical computing resources can pose challenges.

Figure 5:
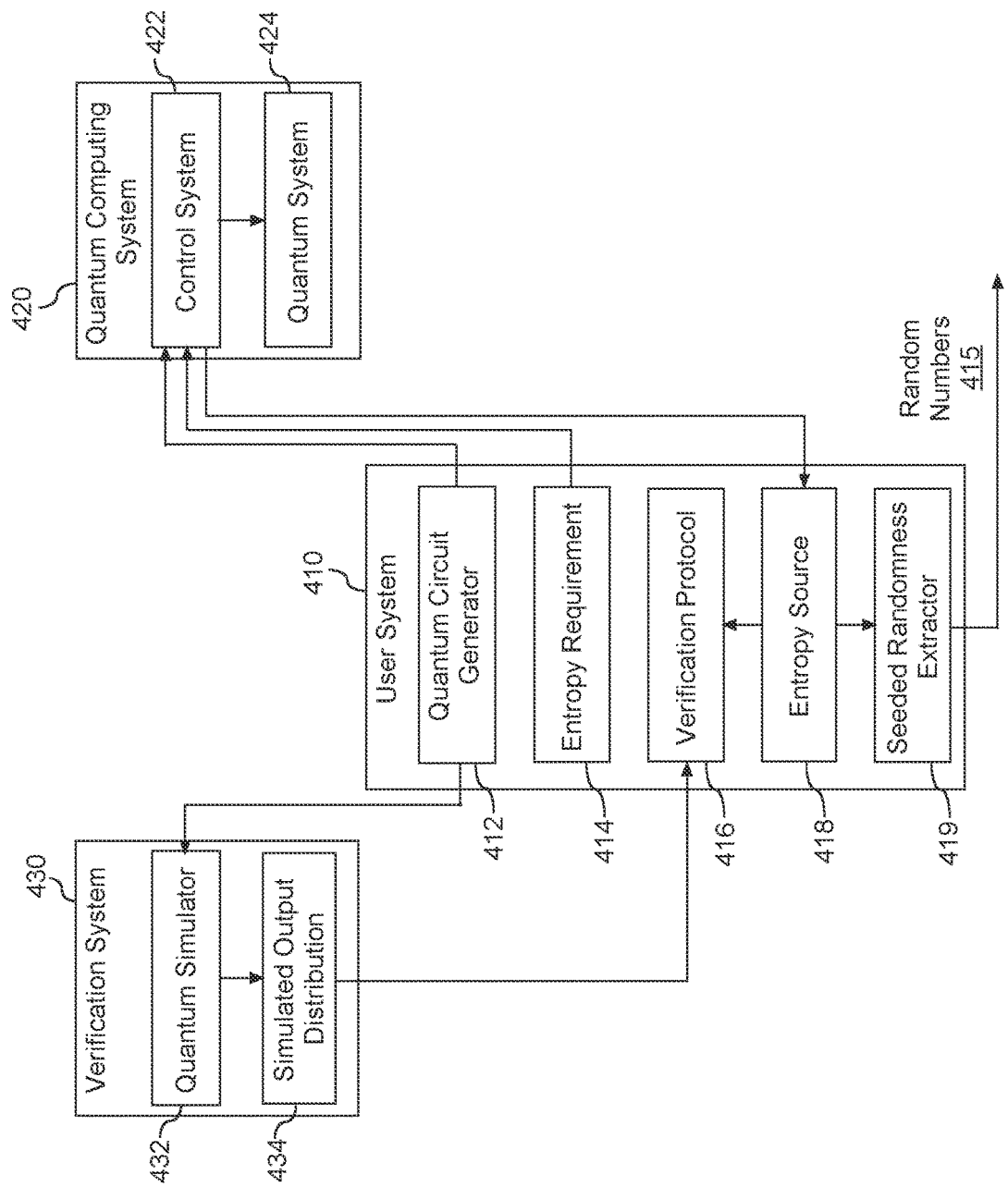
FIG. 5 depicts an example verified example verified quantum random number generation system according to example embodiments of the present disclosure.

FIG. 5 depicts an example system for offloading verification of quantum random number generation in applications for private randomness. More particularly, the user system 410 can be configured to generate random numbers from a quantum entropy source without sharing the seeded randomness extractor and/or random numbers with the quantum computing system and/or the verification system. In other embodiments, the random number generation system can be implemented by the entity associated with the quantum computing system, the verification system, or other system. The user system 410 can be associated with a provider of random numbers (e.g., as part of a web service or other service). An example user system 410 can be implemented as system 710 shown in FIG. 9.

As shown in FIG. 5, the user system 410 can interact with a quantum computing system 420 to obtain a plurality of output samples for a quantum entropy source. The quantum computing system 420 can include a combination of classical and quantum computing resources that are used to generate output samples from a quantum system (as described herein) for use as a quantum entropy source for the random number generation system. An example quantum system can be the server computing system 720 and quantum computing system 730 shown in FIG. 9.

As shown in FIG. 5, the user system 410 can also interact with a verification system 430 to determine that a quantum computing system was used to generate the quantum entropy source and/or to otherwise verify, certify, or audit aspects of the random number generation protocol. The verification system 430 can be associated with a third party or with the same entity associated with the quantum computing system. An example verification system 430 is the verification computing system 740 of FIG. 9.

The verification system 430 can have sufficient computing resources to perform classical simulations of the quantum circuit used to generate the quantum entropy source. The classical simulations can be used as part of the verification protocol for quantum random number generation. For instance, the verification system 430 can include 1 million or more CPU cores that are capable of running simulations for hours or more.

A user system 410 can include a quantum circuit generator 412 that generates a random quantum circuit based on input from a user (e.g., a seed used for random quantum circuit) generation. The quantum circuit can include one or more quantum gates as discussed above. In some embodiments, a user can specify characteristics of the quantum circuit (e.g., number of qubits operated on, circuit depth, types of gates, number of multiple-qubit gates etc.). The characteristics can be set such that the simulation time for classically simulating the quantum circuit is longer than a threshold T (e.g., longer than 1 minute). The threshold T can be set such that a quantum computer can return the output samples in less than time T but it takes longer than time T to classically simulate. The more difficult the quantum circuit to simulate, the more expensive the verification process (e.g., costs to classically simulate).

Data indicative of the quantum circuit 412 can be provided to a quantum computing system 420. The quantum computing system 420 can include a control system 422 used to implement the quantum circuit on a quantum system 424 having a plurality of qubits and to perform measurements of the state of the quantum system after implementation of the quantum circuit to generate output samples (e.g. bit strings). In some embodiments, multiple quantum systems may be used in parallel to execute the quantum circuit. In some embodiments, the number of output samples can be determined to achieve an entropy requirement 414 specified by a user of the quantum random number generation system as discussed in detail with reference to FIG. 4.

The output samples can be provided to the user system 410 for use as a quantum entropy source 418 for random number generation. A seeded randomness extractor 419 can be used to determine random number(s) 415 from the entropy source 418. The seeded randomness extractor 419 and the random number(s) 415 can be kept private.

The user system 410 can be configured to implement a verification protocol 416 to determine that the quantum entropy source 418 was properly generated by a quantum system. The user system 410 may not have enough classical computing resources to classically simulate the quantum circuit implemented by the quantum computing system 420.

In that regard, the user system can offload a portion of the verification protocol 416 to the verification system 430.

More particularly, the user system 410 can send data indicative of the quantum circuit (e.g., as determined from the quantum circuit generator 412) to the verification system 430. The verification system 430 can implement a quantum simulator 432 to simulate the quantum circuit and generate a simulated output distribution 434. The simulated output distribution 434 can include simulated output samples and/or it can include probabilities associated with generating certain output samples. Data indicative of the simulated output distribution 434 can be provided to the user system 410 for implementation of the verification protocol 416.

The quantum simulator 432 can be configured to implement parallelizable map reduce algorithms to simulate the quantum circuit. In some embodiments, the quantum simulator 432 can be configured to run many independent simulations of the quantum circuit. The results can be aggregated to determine an expected output distribution. Data indicative of the expected output distribution can be provided as the simulated output distribution 434 to the user system 410 for implementation of the verification protocol 416.

There exists parallelizable algorithms to classically simulate quantum circuits to determine output sample probabilities for a given set of output samples. One example parallelizable algorithm to classically simulate (e.g., with classical processors) the quantum circuit includes the Schrödinger-Feynman algorithm. The Schrödinger-Feynman algorithm can break the circuit up into two patches of qubits. The 2-qubit gates connecting both patches are called cross gates. Each 2-qubit gate is decomposed as a sum of pairs of 1-qubit gates. Each value of a multi-index determines one term in the sum for each cross 2-qubit gate. The user system 410 and the verification system 430 can both agree on this notation of multi-index, valid for any quantum circuit. Each value of the multi-index corresponds to an independent simulation for which the quantum simulator 432 calculates the corresponding partial probabilities. The final output probabilities correspond to the sum of all the partial probabilities for each value of the multi-index.

This can be generalized in multiple ways. For instance, independent simulations can be determined by a prefix of the multi-index. For 2-qubit gates not specified in the prefix all the terms in their sum can be applied in the independent simulation. A quantum circuit can be broken up into more than two patches. Patches can be broken recursively.

Another example parallelizable algorithm includes the Feynman algorithm. The Feynman algorithm maps the calculation of the probability of one output sample to a tensor network or a graphical model. The probability of each output sample results in an independent computation. In this case the user system 410 and the verification system 430 can identify independent computations by each output sample.

The Feynman algorithm can be further parallelized by projecting one or more vertices of the undirected graphical model into bit values, 0 and 1. Each vertex projection can double the number of independent computations. The Feynman algorithm can be further parallelized by introducing a cut in the tensor network and decomposing 2-qubit gates across the cut as in the Schrodinger-Feynman algorithm. These techniques can be combined into mixed algorithms.

The user system 410 can implement a verification protocol 416 based on the simulated output 434 from the verification system 430 to determine the quantum entropy source. In some embodiments, the verification system 430 records the result of each of the independent simulations and returns this record of results to the user system 410 as the simulated output distribution 434. The user system 410 aggregates these results to determine the full set of ideal or simulated probabilities for the output samples. The user system 410 can then verify the quantum entropy source, for instance by performing benchmarking tests, such as cross-entropy benchmarking tests as the verification protocol 416.

In some embodiments, the user system 410 can randomly (using randomness that is not previously known to the verification system 430) select a subset of the output samples to simulate on its own. This can be useful if the individual output samples can be aggregated together in multiple stages. For instance, in the Feynman-Schrodinger algorithm each independent simulation can compute partial probabilities corresponding to a multi-index or prefix. The partial probabilities for each output sample can be added to obtain the final ideal or simulated probabilities. These additions can be done recursively in multiple stages.

In some cases, the user system 410 can be configured to implement the verification protocol 416 with less data transfer from the verification system 430 to the user system 410. In some embodiments, less than all the sets of partial probabilities need to be transferred.

Figure 6:
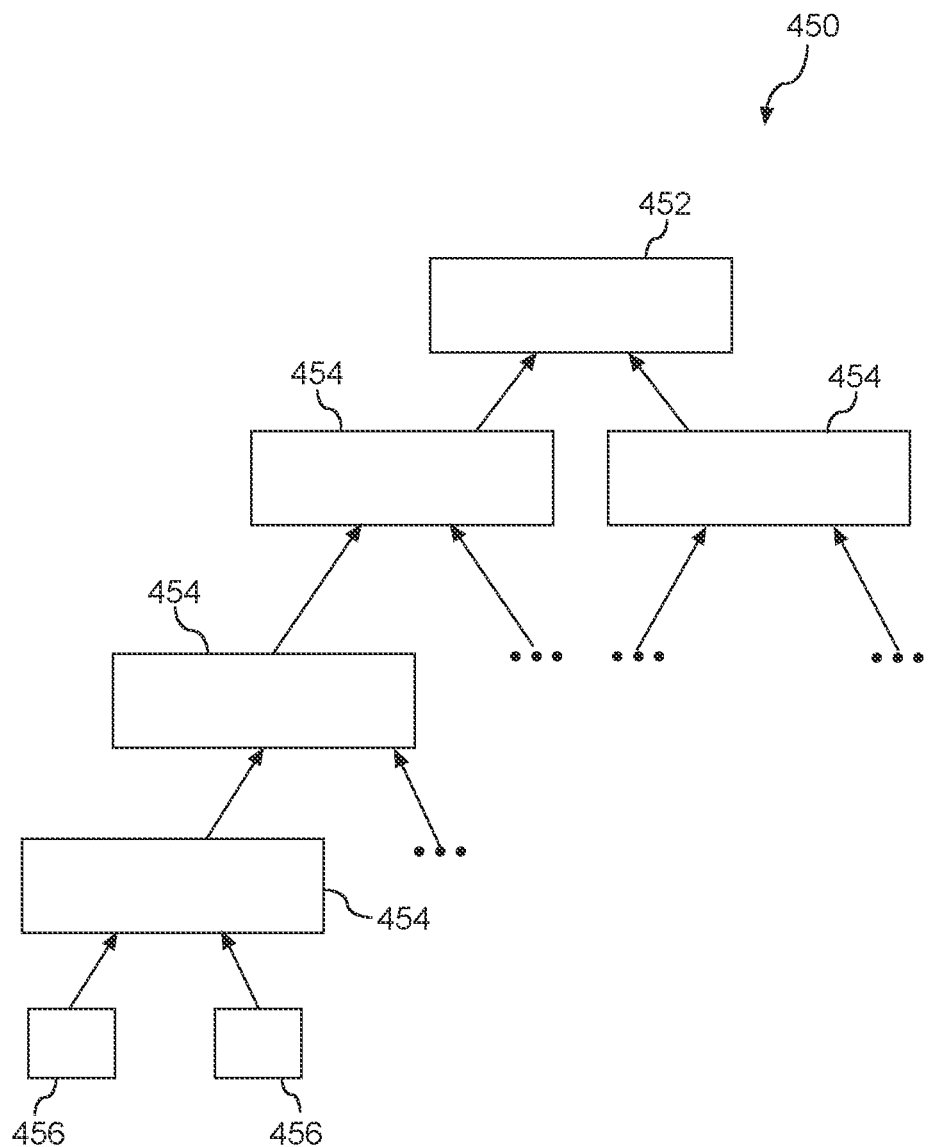
FIG. 6 depicts an example hash tree structure according to example embodiments of the present disclosure.

More particularly, data indicative of the simulated output distribution 434 can include data associated with a hash tree structure generated based on the simulated output distribution. The hash tree structure can be a Merkle-tree-like structure. FIG. 6 depicts an example Merkle-tree-like structure with a root node 452, intermediate nodes 454, and leaf nodes 456. In the Merkle-tree-like structure, the leaf nodes 456 are each a cryptographic hash of one of the simulation results. The other nodes (e.g., intermediate nodes 454 and root node 452) are each a cryptographic hash of a (canonical) serialized data structure (e.g., list, tuple) that includes the intermediate (or final) aggregate result and each of its children nodes in this Merkle-tree-like structure 450 (or alternatively, each of the hashes of its children in this Merkle-tree-like structure 450).

The verification system 430 can commit to all of the simulation results and the intermediate aggregate results by returning only the root of the Merkle-tree-like structure 450. In some embodiments, the cryptographic hash that can be sufficiently collision-resistant and pre-image-resistant against adversaries with quantum computing capabilities.

In some embodiments, to implement the verification protocol 416, the user system 410 can randomly (e.g., using randomness that is not previously known to the verification system 430) select a subset of the leaf nodes 456 to check. The user system 410 can check each simulation by obtaining from the verification system 430 the nodes of the Merkle-tree-like structure 450 in the path from the root to the leaf node for the selected simulation. For each of those obtained nodes, the user system 410 can also obtain nodes from the verification system 430 as follows: (1) if the node is not a leaf node, the corresponding serialized data structure (e.g., list, tuple) including the corresponding intermediate aggregate result and the node's children (which are each represented by a cryptographic hash); (2) if the node is a leaf node, the corresponding simulation result. The user system 410 can verify the cryptographic hashes in the obtained path. In some embodiments, the user system 410 can re-run the selected simulation to ensure that the result in the selected leaf node is correct.

Figure 7:
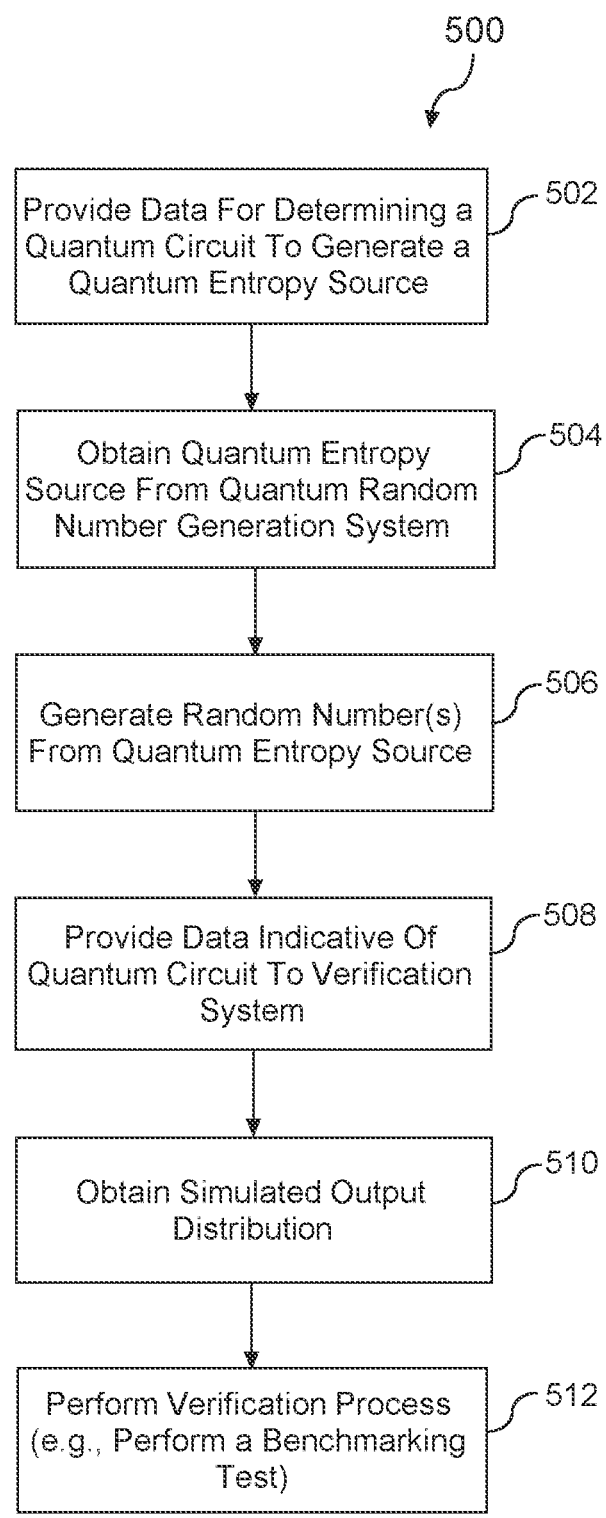
FIG. 7 depicts a flow diagram of an example method according to example embodiments of the present disclosure.

FIG. 7 depicts a flow diagram of an example method (500) according to example embodiments of the present disclosure. The method (500) can be implemented, for instance, using the user system 410 (FIG. 5) or any other suitable computing system. FIG. 7 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At (502), the method includes providing data indicative of a quantum circuit to generate a quantum entropy source to a quantum computing system. For instance, the user system 410 (FIG. 5) can send data indicative of the quantum circuit to the quantum computing system 420.

At (504), the method includes obtaining a quantum entropy source implemented by a quantum computing system. For instance, after the quantum computing system 420 performs a repeated number of measurements on the quantum system 424 after implementing the quantum circuit on the quantum system 424 to obtain output samples. The output samples can then be communicated or otherwise provided to the user system 410.

At (506), the method includes generating random number (s) from the quantum entropy source. For instance, the user system 410 can generate random number(s) 415 using the seeded randomness extractor 419. For instance, the user system 410 can send data indicative of the quantum circuit to the verification system 430.

At (508), the method includes providing data indicative of a quantum circuit to generate a verification system to classically simulate the quantum circuit using a classical computing system. The verification system 430 can implement a quantum simulator 432 to simulate the quantum circuit as discussed above to generate a simulated output distribution 434. Example classical algorithms used to simulate the quantum circuit can include a Schrödinger-Feynman algorithm or a Feynman algorithm.

At (510), the method includes obtaining simulated output distribution from the verification computing system. For instance, the user system 410 can obtain the aggregated set of probabilities for each output sample from the verification system. In addition and/or in the alternative, the user system 410 can obtain data associated with a hash tree structure encoding the simulated output distribution 434.

At (512), the method includes performing a verification process using the simulated output distribution. For instance, the method can include conducting a benchmarking test, such as a cross-entropy benchmarking test. In some embodiments, patch cross-entropy benchmarking, elided cross-entropy benchmarking, or other simplified cross-entropy benchmarking can be used.

Figure 8:
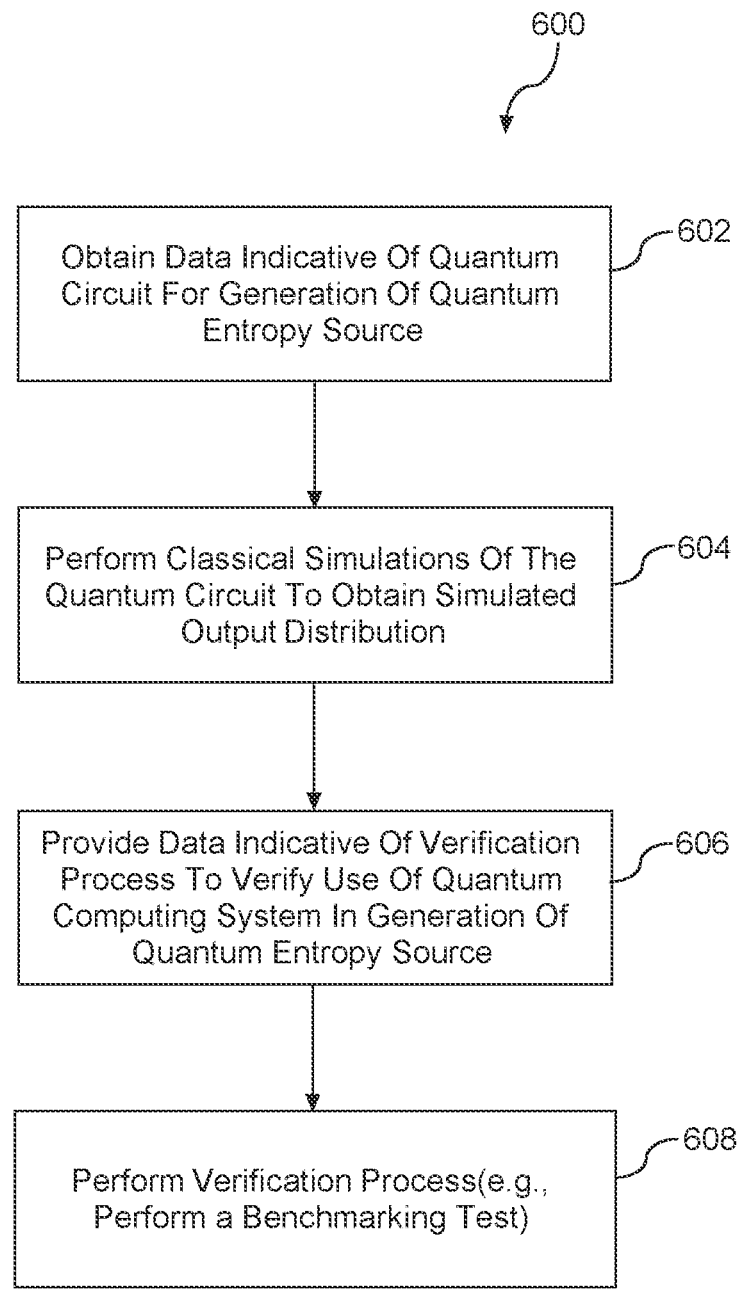
FIG. 8 depicts a flow diagram of an example method according to example embodiments of the present disclosure.

FIG. 8 depicts a flow diagram of an example method (600) according to example embodiments of the present disclosure. The method (600) can be implemented, for instance, using the verification system (FIG. 5) or any other suitable computing system. FIG. 8 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At (602), the method includes obtaining data indicative of a quantum circuit used for generation of a quantum entropy source. For instance, the verification system 430 can obtain data indicative of a quantum circuit used to generate a quantum entropy source from user system 410 as shown in FIG. 5.

At (604), the method includes performing classical simulations of the quantum circuit to obtain simulated output distribution. For instance, the verification system 430 can implement a quantum simulator 432 to simulate the quantum circuit as discussed above to generate a simulated output distribution 434. Example classical algorithms used to simulate the quantum circuit can include a Schrödinger-Feynman algorithm or a Feynman algorithm.

At (606), the method includes providing data indicative of simulated output distribution for use in a verification process. For instance, the verification system 430 can provide the aggregated set of probabilities for each output sample from the verification system to the user system 410 for use in the verification protocol 416. In addition and/or in the alternative, the verification system 430 can data associated with a hash tree structure encoding the simulated output distribution 434.

In some embodiments, at (608), the method can include performing a verification process. For instance, in some embodiments, the verification system 430 can perform the verification process 416 and provide the results to the user system 410. The verification process can include conducting a benchmarking test, such as a cross-entropy benchmarking test. In some embodiments, patch cross-entropy benchmarking, elided cross-entropy benchmarking, or other simplified cross-entropy benchmarking can be used.

Example aspects of the present disclosure can be used to provide verified quantum random numbers to be used in applications for private randomness where generated random numbers, seeded randomness extractors, and/or quantum entropy sources used to generate random numbers are not shared. Example private randomness can occur for cryptographic key generation where random numbers, seeded randomness extractors and entropy sources used to generate cryptographic keys are not shared.

Example applications of verified quantum random number generation in a private randomness context will now be set forth. For instance, in some embodiments, an entity associated with a verification system for verifying one or more aspects of the random number generation protocol can be the same entity as the entity associated with the user of the quantum random number generation system. As one example, an entity associated with providing a cryptographic key generation service can be a user of a quantum random number generation service as well as being a verifying entity for the quantum random number generation service. In this case, the confidentiality of the randomness may not need to be protected from the verification system (as it is the same entity using the randomness). The verifying entity can simply execute the random number generation protocol as the user.

In some embodiments, the user of the quantum random number generation service can offload the verification to a verification system (e.g., for classical simulation). The user system, however, can maintain the confidentiality of random number(s) generated using the quantum entropy source by maintaining the random numbers and seeded randomness extractor confidential.

In some embodiments, a user of a quantum random number generation system can randomly select a subset of generated random numbers to reveal and use for verification purposes. For instance, if the user of the quantum random number generation system desires to maintain the confidentiality of n random numbers, the user can generate m random numbers, where m>n, and afterwards, randomly select m-n of those random numbers to verify. The confidentiality of the remaining n random numbers is not affected (given that the m random numbers are independent).

In some embodiments, the user can obtain k output samples for a quantum entropy source from a quantum computing system for use in generation of random numbers. However, the user may only use s of the output samples for verification. In this way, if the verification process does not adequately protect the confidentiality of the output samples, the user can simply use the remaining k-s samples as the quantum entropy source for random number generation. In addition and/or in the alternative, the user can use k output samples, but use the conditional entropy of the k samples given the s revealed samples as the min-entropy for random number generation.

A cryptographic key generation service can use random numbers generated using a quantum random number generation system to generate cryptographic keys. A user of the cryptographic key generation service may need to verify that the quantum entropy source used by the quantum random number generation system was generated by a quantum computing system and to check that the quantum entropy source was used to generate the cryptographic key.

In some embodiments, a user can provide for the audit of new keys generated by the cryptographic key generation service. For instance, a user of the cryptographic key generation service can provide two distinct plaintext messages: $m_0$ and $m_1$. The cryptographic key generation service can obtain two random numbers from the quantum random number generation system and can record the protocol associated with each random number so that it can be provided to a user of the cryptographic key generation service for verification.

More particularly, the cryptographic key generation service can generate two keys (one from each random number): $k_0$, $k_1$. The cryptographic key generation service can encrypt and return each message with the corresponding key: $c_0 = E_{k0}(m_0)$, $c_1 = E_{k1}(m_1)$. The user (using randomness that is not previously known to the cryptographic key generation service or the random number generation system, can randomly select one of the keys and can audit the generation of selected key. The cryptographic key generation service saves the other key for normal use. The cryptographic key generation service can provide the user with the transcript of the random number generation protocol (along with the randomness extractor seeds). The user can verify that the quantum random number generation protocol was correctly executed and that the selected key was generated from the random number from the quantum random number generation system. The user can then use the key to decrypt $c_i$. The user may also record the transcript associated with creation of the key and the encrypted message to perform the audit in the future.

To check the timing of the protocol, the user may trust the timestamps from cryptographic key generation service without further verification. Or, the user can use the timing of when the user sent the random circuit seed and when the user received the ciphertexts to bound the time available to the random number generation system. Or, the user can rely on some other time-stamping mechanism supported by the cryptographic key generation service without deviating from the scope of the present disclosure.

The selection of a seeded randomness extractor can be done by the user and/or by the cryptographic key generation service. Various options exist that can ensure that the seeded randomness extractor is not known to the random number generation system before the random output samples for the quantum entropy source are returned. For example, the quantum entropy source can be sent to the cryptographic key generation service before the user reveals the seeded randomness extractor. The user can check to verify the output samples were used to generate an audited key.

Variations and modifications can be used to generate different quantities of keys, allow different quantities of keys to be audited, and allow different quantities of keys to be kept. This approach can be adapted for other types of cryptographic keys as well. For asymmetric keys, the user does not need to provide two distinct plaintext messages: $m_0$ and $m_1$. Instead of sending the user $c_0$ and $c_1$, the cryptographic key generation service can send the corresponding public keys to the user. In the verification step, instead of checking that a key decrypts a message, the user should check that the key is the correct private key for a corresponding public key.

In some embodiments, the cryptographic key generation service may be able to retire a key after all copies of all of its ciphertexts have been destroyed. The data may be re-encrypted with a different key to avoid data loss before the ciphertext is destroyed. Once the ciphertexts are all destroyed, it may be safe for cryptographic key generation service to reveal the key material (and a transcript of the data used to generate the key material) for auditing.

In some embodiments, the quantum random number generation protocol can be recorded for future verification and/or audits. Since such transcripts can be used to regenerate the exact same random number, in private randomness use cases, the confidentiality of these transcripts should be protected with the same level of protection used to protect the resulting random number.

Figure 9:
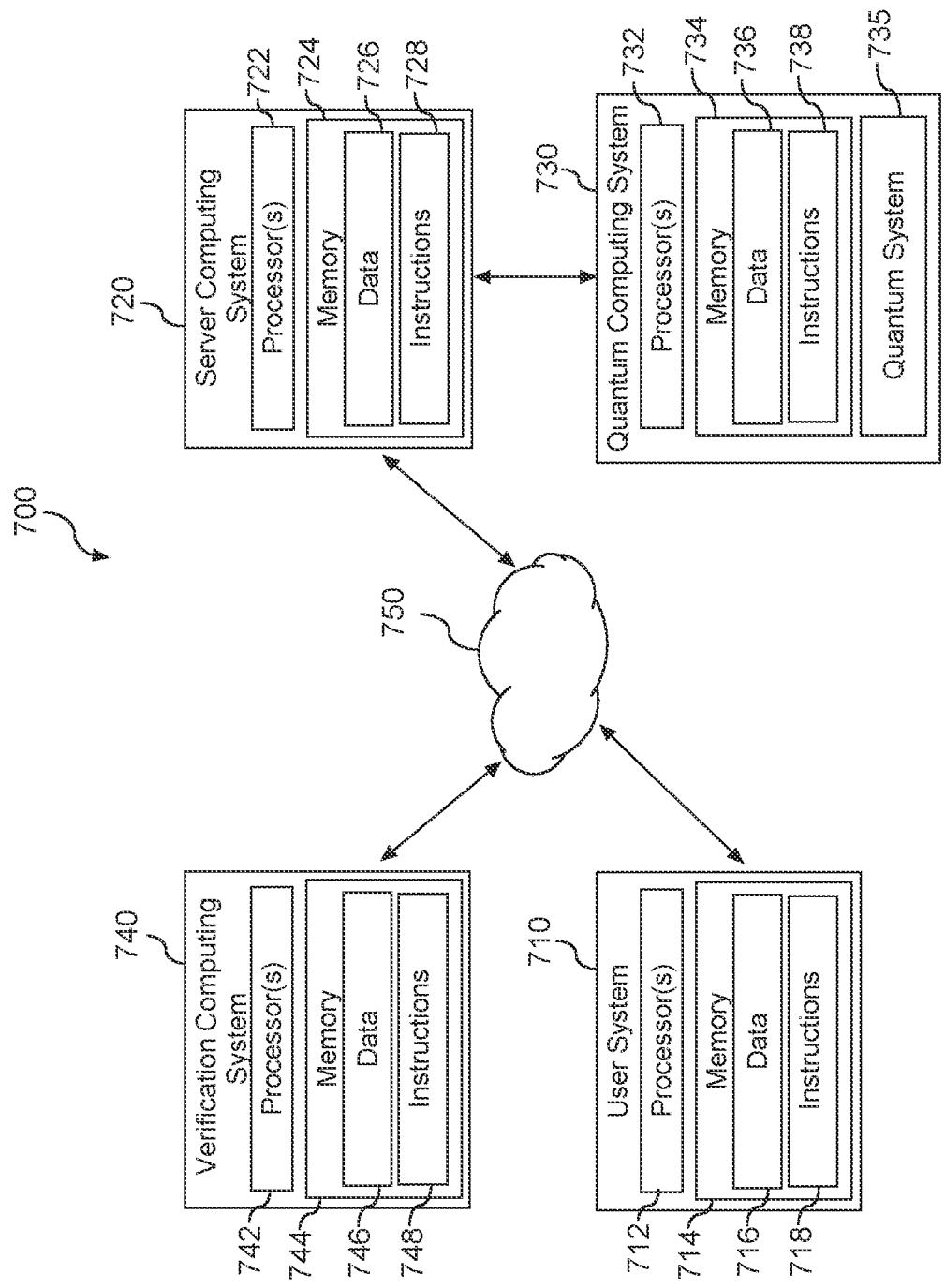
FIG. 9 depicts an example system according to example embodiments of the present disclosure.

FIG. 9 depicts a block diagram of an example computing system 700 that can be used to implement the systems and methods according to example embodiments of the present disclosure, such as the system discussed with reference to FIG. 5. The system 700 includes a user computing system 710, a server computing system 720, a quantum computing system 730 and a verification computing system 740 that are communicatively coupled over a network 750.

The user computing system 710 can include any type of computing device (e.g., classical computing device). The user computing system 710 includes one or more processors 712 and a memory 714. The one or more processors 712 can include any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage mediums, such as RAM, ROM, EEPROM, EPROM, flash memory devices, magnetic disks, etc., and combinations thereof. The memory 714 can store data 716 (e.g., qubit parameters) and instructions 718 which are executed by the processor 712 to cause the user computing device 710 to perform operations.

The server computing system 720 includes one or more processors 722 and a memory 724. The one or more processors 722 can include suitable processing device (e.g., a processor core, a microprocessor, an ASIC, a FPGA, a controller, a microcontroller, etc.) and can be one processor or a plurality of processors that are operatively connected. The memory 724 can include one or more non-transitory computer-readable storage mediums, such as RAM, ROM, EEPROM, EPROM, flash memory devices, magnetic disks, etc., and combinations thereof. The memory 724 can store data 726 and instructions 728 which are executed by the processor 722 to cause the server computing system 720 to perform operations, such as implementation of a quantum random number generation service.

The server computing system 720 can be coupled to a quantum computing system 730. The quantum computing system 730 can be similar to the quantum computing system discussed and described with reference to FIG. 1. Other suitable quantum computing systems can be used without deviating from the scope of the present disclosure.

The verification computing system 740 includes one or more processors 742 and a memory 744. The one or more processors 742 can include any suitable processing device (e.g., a processor core, a microprocessor, an ASIC, a FPGA, a controller, a microcontroller, etc.) and can be one processor or a plurality of processors that are operatively connected. The memory 744 can include one or more non-transitory computer-readable storage mediums, such as RAM, ROM, EEPROM, EPROM, flash memory devices, magnetic disks, etc., and combinations thereof. The memory 744 can store data 746 and instructions 748 which are executed by the processor 742 to cause the verification computing system 740 to perform operations.

The network 750 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for determining use of a quantum computing system in a quantum random number generation system, the quantum random number generation system being implemented at least in part using the quantum computing system having one or more qubits, the method comprising:
obtaining, by one or more computing devices comprising one or more classical processors, data indicative of a quantum circuit used by the quantum random number generation system to perform a quantum operation to generate a quantum entropy source for determining a private random number, the quantum circuit comprising one or more quantum gates, the quantum entropy source comprising a plurality of output samples, each output sample obtained by measuring an output of the quantum circuit;
performing, by the one or more computing devices, one or more simulations of the quantum circuit to obtain a simulated output distribution of the quantum circuit without access to data associated with the private random number; and
providing, by the one or more computing devices, data indicative of the simulated output distribution for use in a verification process for the quantum random number generation system, the verification process determining the use of the quantum computing system in generation of the quantum entropy source;
wherein the one or more computing devices are associated with a verification computing system that is distinct from a computing system associated with a user of the quantum random number generation system, wherein the data associated with the private random number is maintained confidential and is not shared with the one or more computing devices associated with the verification computing system; and
wherein the data associated with the private random number comprises the private random number or a seeded randomness extractor used to generate the private random number.

2. The method of claim 1, wherein the verification process comprises performing a benchmarking test based at least in part the simulated output distribution and the quantum entropy source.

3. The method of claim 2, wherein the benchmarking test comprises a cross-entropy benchmarking test.

4. The method of claim 1, wherein the verification process is implemented based on only a subset of the plurality of output samples of the simulated output distribution.

5. The method of claim 1, wherein the one or more simulations are performed using a Schrodinger-Feynman algorithm.

6. The method of claim 1, wherein the one or more simulations are performed using a Feynman algorithm.

7. The method of claim 1, wherein providing, by the one or more computing devices, data indicative of the simulated output distribution comprises providing a plurality of simulated output samples for use in the verification process.

8. The method of claim 1, wherein the verification process comprises:
determining a set of probabilities for the plurality of output samples;
performing a benchmarking test on the set of probabilities.

9. The method of claim 7, wherein providing, by the one or more computing devices, data indicative of the simulated output distribution comprises providing data associated with a hash tree structure generated based on the simulated output distribution, the hash tree structure comprising:
a plurality of leaf nodes, each leaf node associated with a cryptographic hash of a simulated output sample; and
a plurality of intermediate nodes, each intermediate node associated with an aggregate result based on at least one child node of the intermediate node.

10. A computing system for generating a private random number from a quantum entropy source, the quantum entropy source generated at least in part using a quantum computing system having one or more qubits, the computing system comprising:
one or more processors; and one or more memory devices, the one or more memory devices storing computer-readable instructions that when executed by the one or more processors cause the one or more processors to perform operations, the operations comprising:
  providing data indicative of a quantum circuit used to perform a quantum operation in the quantum computing system to generate the quantum entropy source, the quantum circuit comprising one or more quantum gates;
  obtaining the quantum entropy source from the quantum computing system, the quantum entropy source comprising a plurality of output samples of the quantum computing system after implementation of the quantum circuit;
  providing data indicative of the quantum circuit used to perform the quantum operation to generate the quantum entropy source to a verification computing system without providing access to data associated with the private random number, the verification computing system being distinct from the computing system for generating a private random number;
  obtaining data associated with one or more simulations of the quantum circuit from the verification computing system; and
  performing a verification process for the private random number based at least in part on the data associated with the one or more simulations, the verification process determining the use of the quantum computing system in generation of the quantum entropy source.

11. The computing system of claim 10, determining the private random number based at least in part on the quantum entropy source.

12. The computing system of claim 11, wherein the quantum entropy source is not shared with the verification computing system.

13. A method for generating a quantum entropy source for random number generation using a quantum computing system, the quantum computing system comprising one or more qubits, the method comprising:
  obtaining, by one or more computing devices, data indicative of an entropy requirement for the quantum entropy source;
  determining, by the one or more computing devices, a number of output samples to be measured of the one or more qubits after implementing a quantum circuit in the quantum computing system based at least in part on the data indicative of the entropy requirement, the quantum circuit comprising one or more quantum gates;
  obtaining, by the one or more computing devices, a plurality of measurements of the one or more qubits after implementing the quantum circuit based on the number of output samples; and
  providing, by the one or more computing devices, the plurality of measurements as output samples for the quantum entropy source to be used in random number generation;
  wherein the entropy requirement comprises a min-entropy requirement; and
  wherein the number of output samples is determined based on the min-entropy requirement, a fidelity associated with the quantum circuits, and a number of qubits in the quantum computing system.

14. The method of claim 13, wherein the number of output samples is determined based on the min-entropy requirement and a fidelity associated with the quantum circuit.

15. The method of claim 13, wherein the quantum entropy source comprises a plurality of bit strings.

* * * * *